(12) United States Patent
Tang

(10) Patent No.: US 8,247,692 B2
(45) Date of Patent: Aug. 21, 2012

(54) ELECTRONIC DEVICE

(75) Inventor: Zi-Ming Tang, Shenzhen (CN)

(73) Assignees: Fu Tai Hua Industry (Shenzhen) Co., Ltd., ShenZhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 238 days.

(21) Appl. No.: 12/831,367

(22) Filed: Jul. 7, 2010

(65) Prior Publication Data

US 2011/0266017 A1    Nov. 3, 2011

(30) Foreign Application Priority Data

Apr. 30, 2010   (CN) .......................... 2010 1 0160586

(51) Int. Cl.
*H05K 5/00*    (2006.01)

(52) U.S. Cl. .... 174/50; 174/17 R; 439/535; 361/679.01; 248/906

(58) Field of Classification Search ................... 174/50, 174/17 R; 439/535; 248/906; 220/4.02; 361/600, 816, 679.01
See application file for complete search history.

(56) References Cited

U.S. PATENT DOCUMENTS

| | | | |
|---|---|---|---|
| 7,923,634 B2 * | 4/2011 | Yokawa | 174/50 |
| 7,989,696 B2 * | 8/2011 | Shi et al. | 174/50 |
| 8,084,688 B2 * | 12/2011 | Wang et al. | 174/50 |

* cited by examiner

*Primary Examiner* — Dhirubhai R Patel
(74) *Attorney, Agent, or Firm* — Altis Law Group, Inc.

(57) ABSTRACT

An electronic device includes a housing, at least two latching members, an inner frame received in the housing, and at least two bonding films. The latching members are fixed to the inner frame by the bonding films, the housing defines at least two locking portions latched with the at least two latching members.

12 Claims, 4 Drawing Sheets

ELECTRONIC DEVICE

BACKGROUND

1. Technical Field

The present disclosure relates to electronic devices, and particularly to an electronic device with enhanced appearance and relatively low cost.

2. Description of Related Art

Electronic devices with a touch panel have become popular because of their enhanced appearance. A typical electronic device often includes a housing, an inner frame, and a touch panel mounted on the inner frame. One of the housing and the inner frame forms a number of latching hooks, and the other one of the housing and the inner frame defines a plurality of latching portions receiving the corresponding latching hooks. The electronic device employs no fixing members exposed on an outer surface of the housing.

The housing of the electronic device is typically manufactured by punching a metal sheet or injecting one or more plastic materials into a mold. It is difficult to form the latching hooks in the inner surface of the housing due to complexity of the housing structure, such that the manufacturing process becomes more costly.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Figure 1:
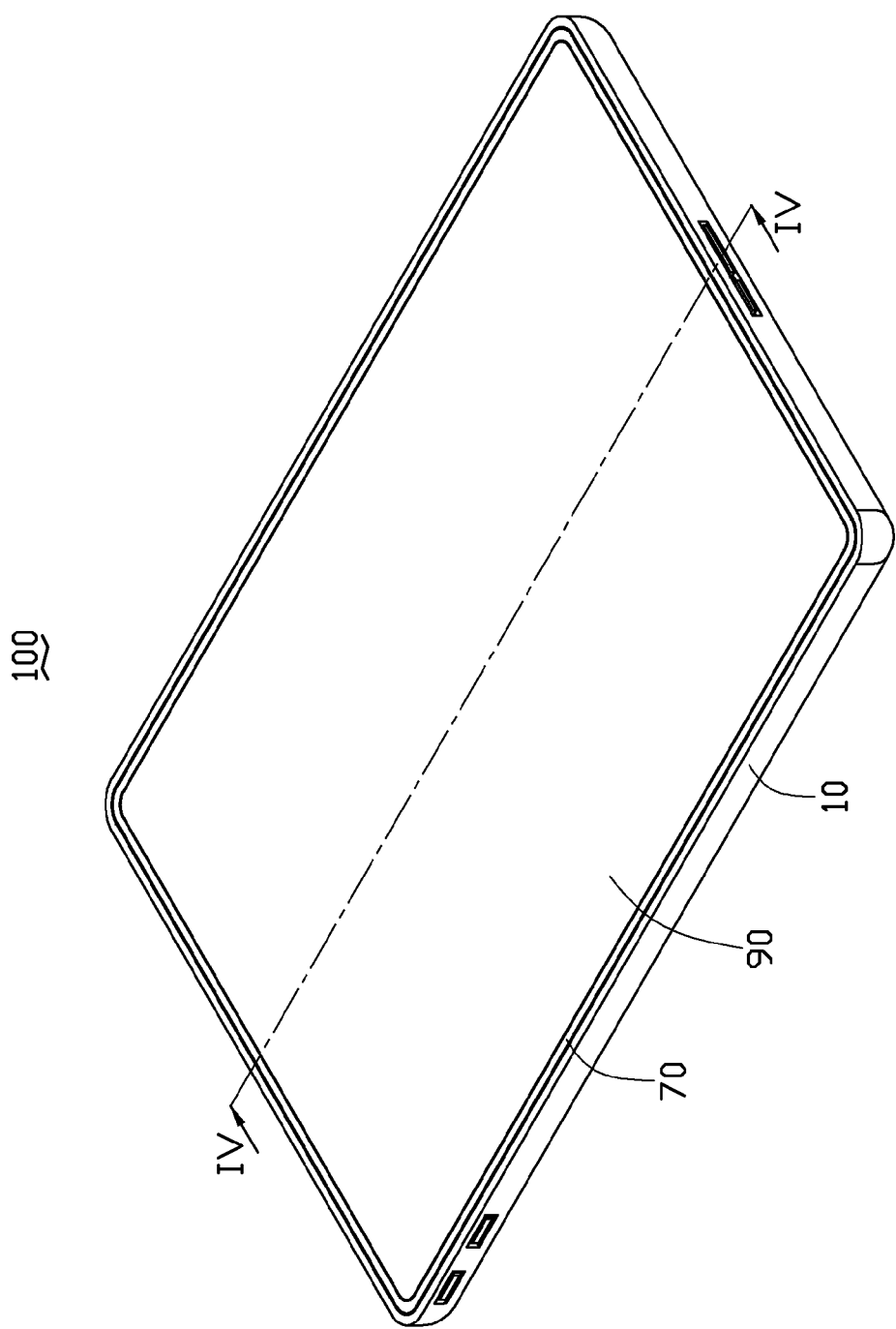
FIG. 1 is an assembled, isometric view of one embodiment of an electronic device.
Figure 2:
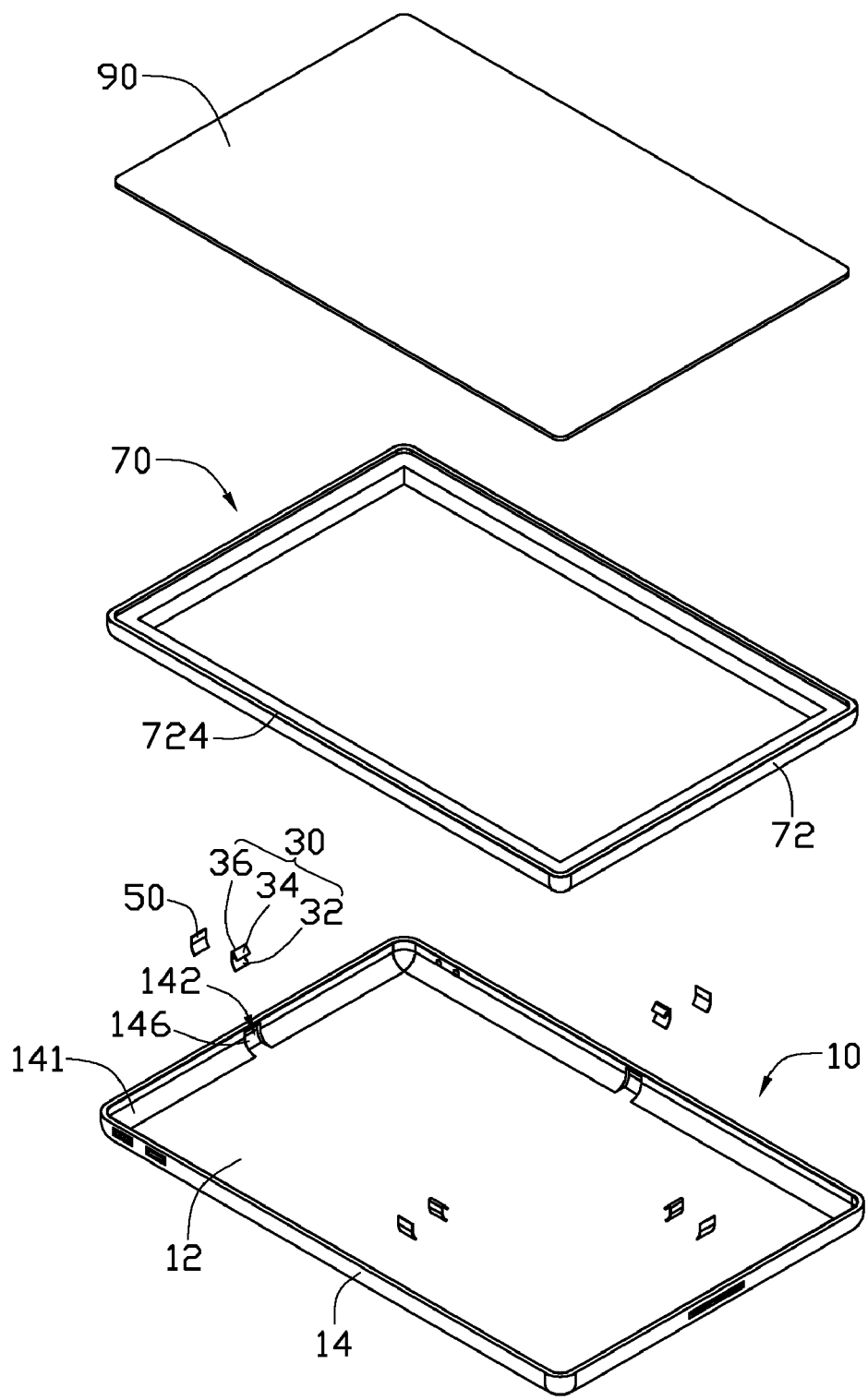
FIG. 2 is an exploded, isometric view of the electronic device of FIG. 1.

The disclosed electronic device may be a personal digital assistant (PDA), a MP3 player, a digital photo frame, a liquid crystal display monitor, or other device. Referring to FIG. 1 and FIG. 2, an embodiment of an electronic device 100 includes a housing 10, four latching members 30, four bonding films 50, an inner frame 70, and a panel 90.

The housing 10 includes a base 12 and four sidewalls 14. The base 12 is a substantially rectangular board. Each sidewall 14 is a curved border and extends from an edge of the base 11. An end of the sidewall 14 is joined to an end of the adjacent sidewall 14. Each sidewall 14 includes an inner surface 141 and a receiving groove 142 defined therein. The receiving groove 142 includes a restriction surface 144 (shown in FIG. 4) away from the base 12, and a bonding surface 146 extending from the restriction surface 144 to the base 12. The restriction surface 144 is substantially parallel to the base 12. The bonding surface 146 is a curved surface having a shape similar to that of the sidewall 14.

The latching member 30 is a substantially U-shaped clip and includes a fixing portion 32, a latching portion 34, and a bent portion 36 interconnecting the fixing portion 32 and the latching portion 34. The fixing portion 32 is a curved section having a shape similar to that of the bonding surface 146, such that the latching member 30 can substantially adhere to the bonding surface 146, thereby improving a bonding strength between the latching member 30 and the bonding surface 146.

The bonding film 50 is of a shape similar to that of the bonding surface 146, such that the bonding film 50 can substantially adhere to the bonding surface 146. In the illustrated embodiment, the bonding film 50 is a double-sided adhesive tape. Alternatively, the bonding film 50 may be a thermoplastic adhesive bonding film.

Figure 3:
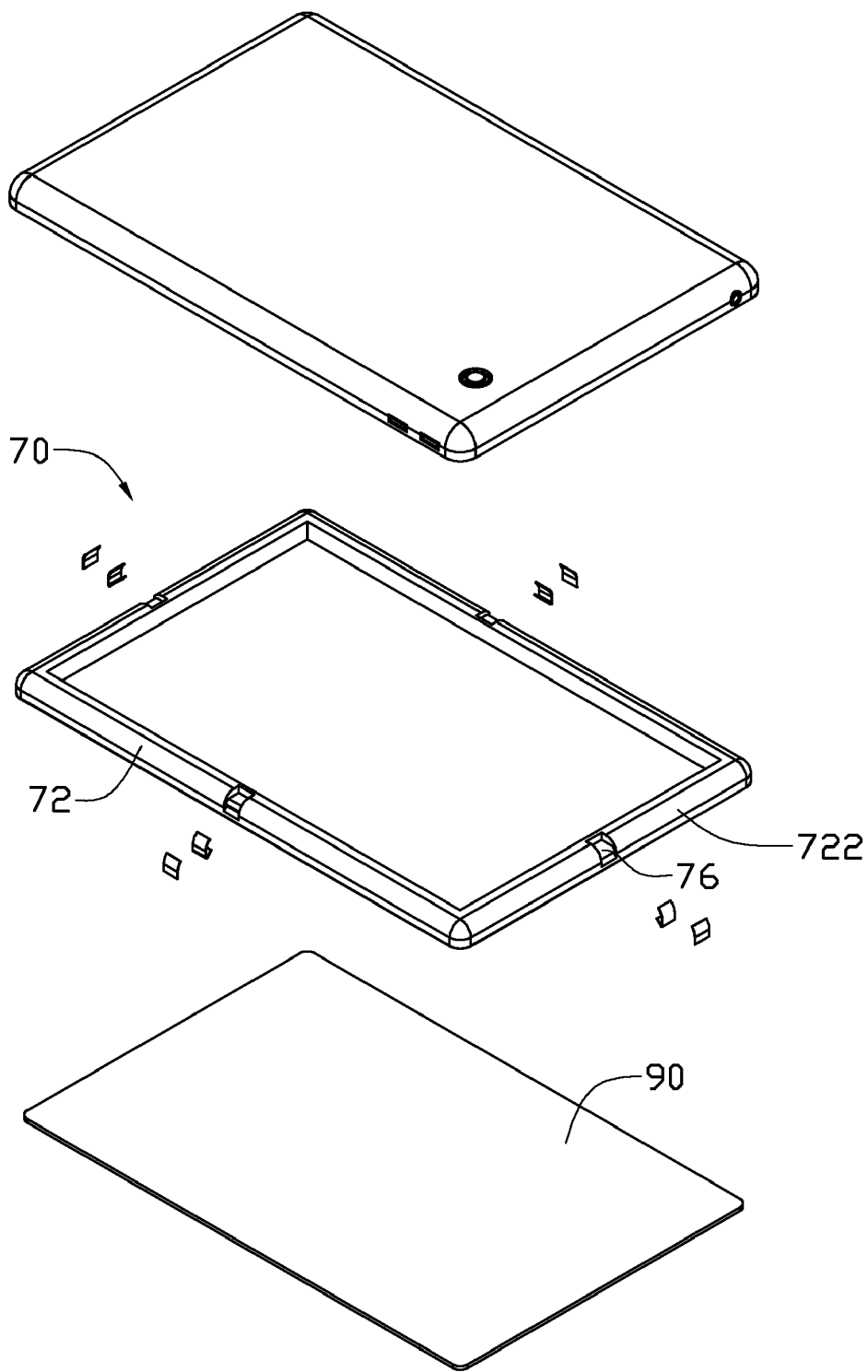
FIG. 3 is similar to FIG. 2, but viewed from another aspect.
Figure 4:
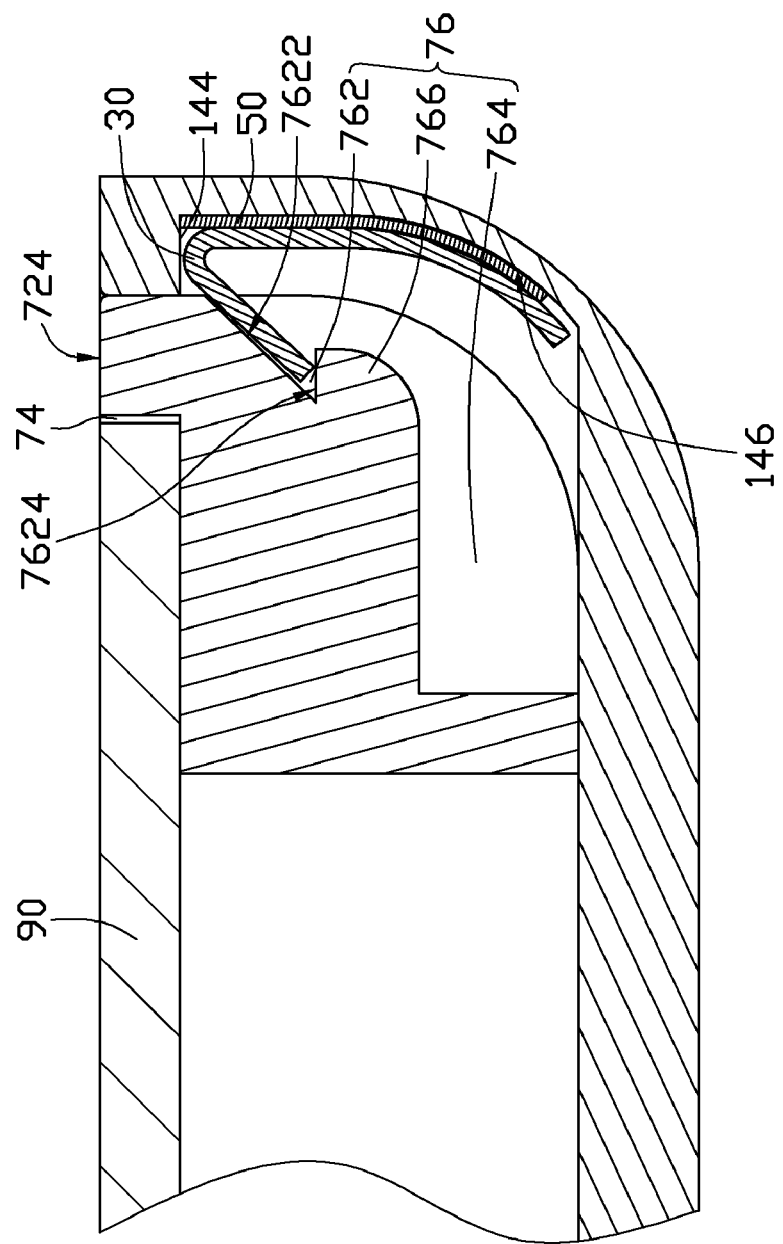
FIG. 4 is a partial cross section of the electronic device taken along line IV-IV in FIG. 1.

Referring to FIG. 3 and FIG. 4, the inner frame 70 includes four connecting edges 72. One end of each connecting edge 72 is joined to an end of the adjacent connecting edge 72. The connecting edge 72 includes a contact surface 722 and an end surface 724 adjoining the contact surface 722. The contact surface 722 is a curved surface of a shape similar to that of the inner surface 141, thereby substantially abutting the inner surface 141. The end surface 724 is a planar surface. The inner frame 70 includes a receiving portion 74 and four locking portions 76 corresponding to the four latching members 30. The receiving portion 74 is a recess depressed from the inner side of the end surface 724 for receiving the panel 90. The locking portion 76 is formed in the contact surface 722. The locking portion 76 includes a locking recess 762, an assisting recess 764, and a resisting protrusion 766 positioned between the locking recess 762 and the assisting recess 764. The locking recess 762 is adjacent to the end surface 724, and the assisting recess 764 is away from the end surface 724. The resisting protrusion 766 forms a rounded corner adjacent to the assisting recess 764. The locking recess 762 has an oblique surface 7622 inclined relative to the end surface 724 and a resisting surface 7624 substantially parallel to the end surface 724. The oblique surface 7622 and the resisting surface 7624 cooperatively define an acute angle therebetween. The assisting recess 764 runs through another end surface that is opposite to the end surface 724.

The panel 90 is a rectangular plate, and can be received in the receiving portion 74. In the illustrated embodiment, the panel 90 is a touch panel.

Each bonding film 50 is adhered to the corresponding bonding surface 146 of the receiving groove 142, and the fixing portion 32 of each latching member 30 is adhered to the bonding film 50. Thus, the bent portion 36 faces or abuts the restriction surface 144, and the latching portion 34 protrudes from the inner surface 141. The inner frame 70 is positioned in the housing 10, and each locking portion 76 faces the latching portion 34 of the corresponding latching member 30. The inner frame 70 is moved toward the housing 10, and the assisting recess 764 is moved over the latching portion 34. As the inner frame 70 is moved further, the resisting protrusion 766 resists and deforms the latching portion 34, which is, accordingly, received in the locking recess 762. The contact surface 722 of each connecting edge 72 abuts the inner surface 141 of the corresponding sidewall 14. The latching portion 34 is restored back to original shape, where an end of the latching portion 34 away from the bent portion 36 abuts the resisting surface 7624, and a surface of the latching portion 34 away from the fixing portion 32 abuts the oblique surface 7622. Thus, the inner frame 70 is fixed to the housing 10. The panel 90 is securely received in the receiving portion 74 of the inner frame 70 by adhesive bonding or other bonding technology.

The latching member 30 is fixed to the inner surface 141 of the housing 10 by the bonding film 50, such that the structure of the housing 12 is relatively simple, and the housing thereby may be more easily manufactured. Therefore, the electronic device 100 has a lower cost.

It should be pointed out that two or more latching members 30, rather than four, such as the two latching members 30, can be fixed to the opposite sidewall 14 respectively. The electronic device 100 may employ more than two latching members 30, whereby the number of the receiving grooves 142, the bonding films 50, and the locking portions 76 are changed accordingly.

The receiving groove 142 may be omitted, whereby the bonding film 50 is fixed to the inner surface 141 of the housing 10 directly. The assisting recess 764 may also be omitted.

It is believed that the present embodiments and their advantages will be understood from the foregoing description, and it will be apparent that various changes may be made thereto without departing from the spirit and scope of the disclosure or sacrificing all of its material advantages.

What is claimed is:

1. An electronic device, comprising:
   a housing comprising a plurality of inner surfaces;
   at least two latching members, each of the at least two latching members comprising a fixing portion and a latching portion; an inner frame received in the housing; and at least two bonding films, wherein the fixing portions of the at least two latching members are fixed to the inner surfaces of the housing via the at least two bonding films, and the inner frame defines at least two locking recesses latched with the latching portions of the at least two latching members.

2. The electronic device of claim 1, wherein the at least two bonding films are a double-sided adhesive tape.

3. The electronic device of claim 1, wherein the at least two bonding films are a thermoplastic adhesive bonding film.

4. The electronic device of claim 1, wherein the housing further comprises at least two receiving grooves defined in the inner surfaces thereof, and each receiving groove has a bonding surface, and the at least two bonding films are substantially adhered to the bonding surface.

5. The electronic device of claim 4, wherein the fixing portion is fixed to at least one of the receiving grooves by the at least two bonding films, and the latching portion protrudes from the inner surfaces of the housing.

6. The electronic device of claim 5, wherein the housing further comprises a base and a plurality of sidewalls extending from the periphery of the base, the sidewalls comprising the inner surfaces of the housing, the receiving grooves are defined in the inner surfaces of the sidewalls, at least one of the receiving grooves has a restriction surface substantially parallel to the base, the bonding surface extends from the restriction surface to the base, each of the at least two latching members further comprises a bent portion interconnecting the fixing portion and the latching portion, the bent portion faces or abuts the restriction surface.

7. The electronic device of claim 1, wherein the inner frame comprises a plurality of connecting edges, each of the connecting edges comprises a contact surface abutting the inner surfaces of the housing and an end surface adjoining the contact surface.

8. The electronic device of claim 7, wherein the at least two locking recesses are formed adjacent to the end surface, and the latching portion is received in the at least two locking recesses.

9. The electronic device of claim 8, wherein the inner frame further comprises a resisting protrusion formed at an end of the at least two locking away from the end surface of the inner frame.

10. The electronic device of claim 9, wherein the inner frame further comprises an assisting recess, the resisting protrusion is positioned between the at least two locking recesses and the assisting recess.

11. The electronic device of claim 7, further comprising a panel, wherein the inner frame defines a receiving portion depressed from the inner side of the end surface, and the panel is securely received in the receiving portion.

12. The electronic device of claim 11, wherein the panel is a touch panel.

\* \* \* \* \*